(12) United States Patent
Ehrman et al.

(10) Patent No.: US 6,688,330 B1
(45) Date of Patent: Feb. 10, 2004

(54) SILENCED VALVE

(75) Inventors: Moshe Ehrman, Halutza (IL); Ehud Orenstein, Halutza (IL); Zohar Moalem, Halutza (IL); Yoav Livne, Halutza (IL); Valdimir Olshanetsky, Beer Sheva (IL)

(73) Assignee: Raval Agriculture Cooperative Societies Ltd., Halutza (IL)

( * ) Notice: Subject to any disclaimer, the term of this patent is extended or adjusted under 35 U.S.C. 154(b) by 150 days.

(21) Appl. No.: 10/031,434

(22) PCT Filed: Jul. 13, 2000

(86) PCT No.: PCT/IL00/00414
§ 371 (c)(1),
(2), (4) Date: Feb. 25, 2002

(87) PCT Pub. No.: WO01/07807
PCT Pub. Date: Feb. 1, 2001

(30) Foreign Application Priority Data

Jul. 23, 1999 (IL) .................................................. 131052

(51) Int. Cl.⁷ .......................... F16K 31/22; F16K 33/00; F16K 24/04
(52) U.S. Cl. .......................... 137/430; 137/43; 137/202; 137/433
(58) Field of Search .......................... 137/59, 43, 202, 137/388, 429, 430, 433, 436

(56) References Cited

U.S. PATENT DOCUMENTS

| | | | |
|---|---|---|---|
| 3,888,274 A | * | 6/1975 | Weston ....................... 137/202 |
| 5,172,714 A | | 12/1992 | Kobayashi et al. |
| 5,711,339 A | | 1/1998 | Kurihara |
| 5,901,733 A | | 5/1999 | Hahori et al. |
| 5,996,607 A | * | 12/1999 | Bergsma et al. ............ 137/202 |
| 6,405,766 B1 | * | 6/2002 | Benjey ........................ 137/202 |
| 6,450,192 B1 | * | 9/2002 | Romanek ..................... 137/202 |

FOREIGN PATENT DOCUMENTS

| EP | 0 922 894 A | 6/1999 |
|---|---|---|
| JP | 04-201718 a | 7/1992 |
| JP | 09-269078 A | 10/1997 |

* cited by examiner

Primary Examiner—George L. Walton
(74) Attorney, Agent, or Firm—Birch, Stewart, Kolasch & Birch, LLP

(57) ABSTRACT

A valve (10) for a fluid tank, comprising a housing formed with one or more inlet (28) and outlet (20) ports, side walls and a seating wall (14) portion supporting a float-type valve member. The valve member is axially displaceable within the housing responsive to fluid level within the tank, between an uppermost position and a lowermost position, and has a top and a bottom end and a bearing portion facing the seating wall portion of the housing. Either one or both of the seating wall portion of the housing and the bearing portion of the valve member, are fitted with one or more dampening members (46) for diminishing impacting noise of the valve member encountering the housing upon displacement into the lowermost position.

12 Claims, 3 Drawing Sheets

SILENCED VALVE

This application is the national phase under 35 U.S.C. §371 of PCT International Application No. PCT/IL00/00414 which has an International filing date of Jul. 13, 2000, which designated the United States of America and was published in English.

FIELD OF THE INVENTION

The present invention is concerned with reducing noise caused during operation of fluid control valves. In particular, the invention is concerned with valves of the type comprising a float member displaceable within a housing between closed and opened positions, responsive to fluid level and fluid dynamics within a vessel.

BACKGROUND OF THE INVENTION

Valves of the referred to type are often fitted in vehicle fuel tanks and the like. Such valves have one or more functions, e.g.: roll-over valve (ROV), over-filling interdiction valve (OFI), filling-limit vent-valve (FLVV) and on-board recovery valve (OBRV), as known in the art. Valves incorporated in vehicles' fuel tanks are a mere example. It will be appreciated however, that such valves may be fitted in a variety of other vessels wherein fluid control is required.

Such valves typically comprise a housing fitted to the vessel, e.g. a fuel tank, with a float member displaceable within the housing, responsive to fluid level and fluid dynamics within the vessel, between closed and opened positions. Typically, when the float member is displaced into a sealing position there are provided resilient sealing means which dampen the impacting noise of the float member encountering the outlet port of the housing. However, during opening displacement of the float member, typically in a downward direction, the float member encounters a wall of the housing, resulting in an impacting noise.

In some cases there is provided a spring member slightly biasing the float member upwardly towards the closed position. However, the biasing force of this spring is essentially soft and the downward displacement of the float member overcomes the biasing spring.

During filling of a vessel and during moving of the vessel, e.g. fueling and travelling of a vehicle, respectively, the float member constantly displaces within the housing whereby an irritating clicking noise may be heard each time the float member encounters the housing.

By some proposed standards, within several years, fuel control valves within vehicle's fuel tanks will have to be provided with means for reducing that impacting noise.

It is thus an object of the present invention to provide a valve fitted with an arrangement for reducing the impacting noise between the housing and the valve member displaceable therewithin.

SUMMARY OF THE INVENTION

It is an object of the invention to provide a silenced fuel control valve wherein displacement of the float element within the valve and its impacting against walls of the housing is essentially silent.

In accordance with the present invention there is provided a valve for a fluid tank, the valve comprising a housing formed with one or more inlet and outlet ports, side walls and a seating wall portion supporting a float-type valve member; the valve member being axially displaceable within the housing responsive to fluid level within the tank, between an uppermost position and a lowermost position; the valve member has a top and a bottom end and a bearing portion bearing facing the seating wall portion of the housing;

the valve characterized in that either one or both of the seating wall portion of the housing and the bearing portion of the valve member, are fitted with at least one dampening member for diminishing impacting noise of the valve member encountering the housing upon displacement into the lowermost position.

In accordance with one aspect of the invention the seating wall portion of the housing is a bottom wall thereof, and the bearing portion of the valve member is a corresponding, facing bottom wall thereof.

In accordance with one specific design, the seating wall portion of the housing is a laterally extending shoulder formed adjacent a top end of the housing, and where the bearing portion of the valve member is a corresponding laterally projecting wall portion adjacent the top end thereof. By one embodiment of this design, the lateral shoulder of the housing is formed adjacent a top end of the housing, and where the bearing wall portion of the valve member is formed adjacent the top end thereof.

In accordance with a preferred embodiment of the invention, the at least one dampening member is fitted at either or both a bottom wall portion of the housing constituting the seating portion, and a bottom wall portion of the valve member housing, constituting the bearing portion.

Preferably the at least one dampening member is a resilient member axially extending from a surface of either one or both of the facing seating wall portion and the bearing wall portion.

By one specific design, the at least one resilient member extends from a bottom seating wall portion of the housing and has a valve-engaging portion upwardly projecting from a seating surface, adapted for engagement with the corresponding bottom, bearing wall portion of the valve member.

By another specific design, the at least one resilient member extends from a bearing wall portion of the valve member and has a housing-engaging portion downwardly projecting from a bearing surface thereof for engagement with a corresponding seating wall portion of the housing.

In accordance with a preferred application of the invention, the at least one resilient member is integrally formed with either or both the bottom wall portion of the housing and the bottom wall portion of the valve member.

Still preferably the at least one resilient member is an arm attached at one end thereof to the respective wall portion, and is formed at an opposed end thereof with an axial projection for engagement with the other respective wall portion.

In order to maintain the float member axially aligned within the housing, it is preferred that at least two dampening members are provided, said dampening members being symmetrically distributed about either or both of the seating wall portion of the housing and the bearing portion of the valve member.

By one specific application of the invention, the base member is integral with the housing. By a different application the base member is attached to the housing and may thus be an add-on devise, for attaching to standard valves.

BRIEF DESCRIPTION OF THE DRAWINGS

For better understanding the invention and to see how it may be carried out in practice, it will now be described in a non-limiting way, with reference to the accompanying drawings, in which.

DETAILED DESCRIPTION OF A PREFERRED EMBODIMENT

Figure 1:
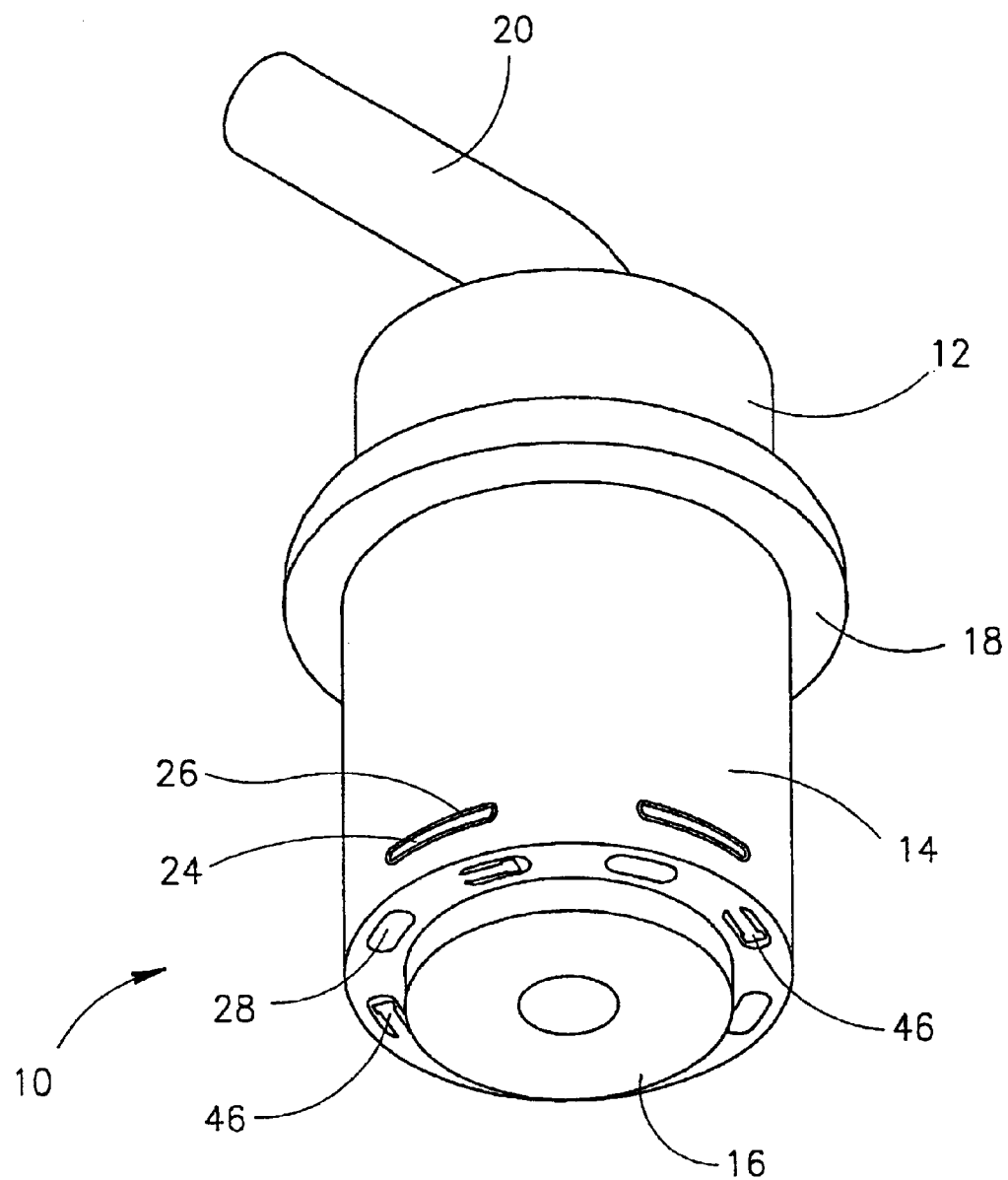
FIG. 1 is a perspective view from bellow, of a valve in accordance with an embodiment of the invention.

Referring first to FIG. 1 of the drawings, there is a general illustration of a float-type valve generally designated 10, comprising a housing 12 with a cylindric side wall 14 and a base member 16. There is an annular shoulder portion 18 typically serving for attaching the valve to a fuel tank, and an outlet nozzle 20.

Figure 2A:
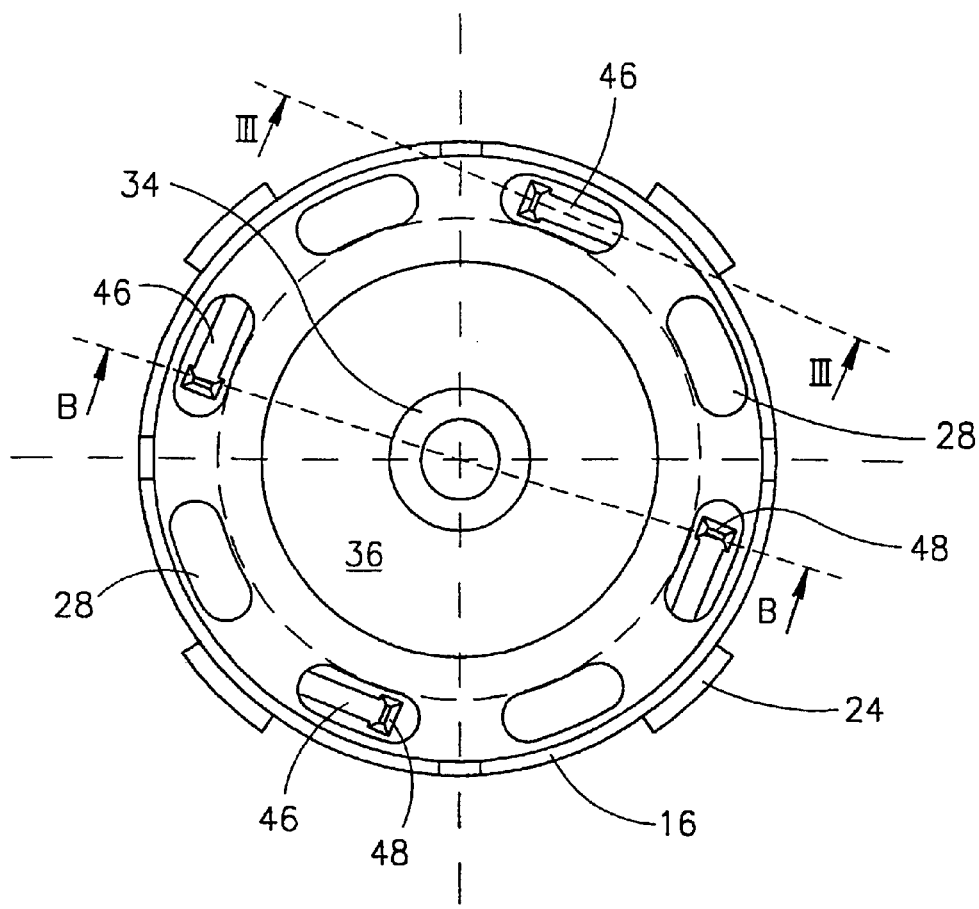
FIG. 2A is a top elevation of a base member of a housing of the valve seen in FIG. 1.

In the present example, base member 16 is attached to the housing 12 by snap-engagement by means of lateral projections 24 engaging into grooves 26 (see also FIG. 2A). A float member (not seen) is axially displaceable within the housing 12 between an upper position in which it sealingly engages an outlet port being in flow communication with nozzle 20, and a lowermost position in which it is disengaged from the outlet but does not interfere with inlet ports 28 formed at the base member 16.

Figure 2B:
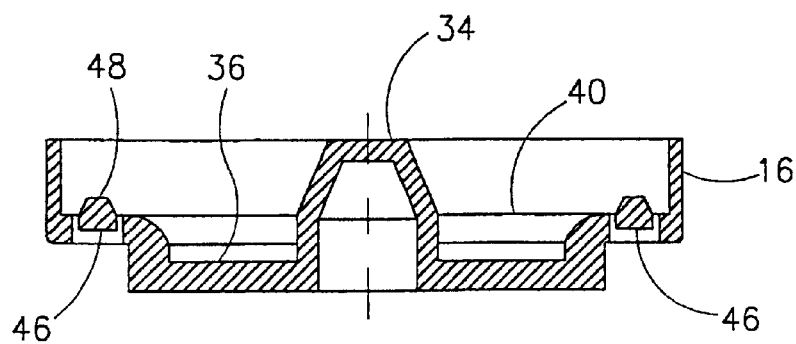
FIG. 2B is a sectional view taken along line B—B in FIG. 2A.

Base member 16, as can be seen also in FIGS. 2A and 2B has a central hub member 34 for sporting a lower portion of a biasing spring (not shown) bearing at one end against surface 36 of the base member 16, and at another end thereof against the float member (not shown).

Figure 3A:
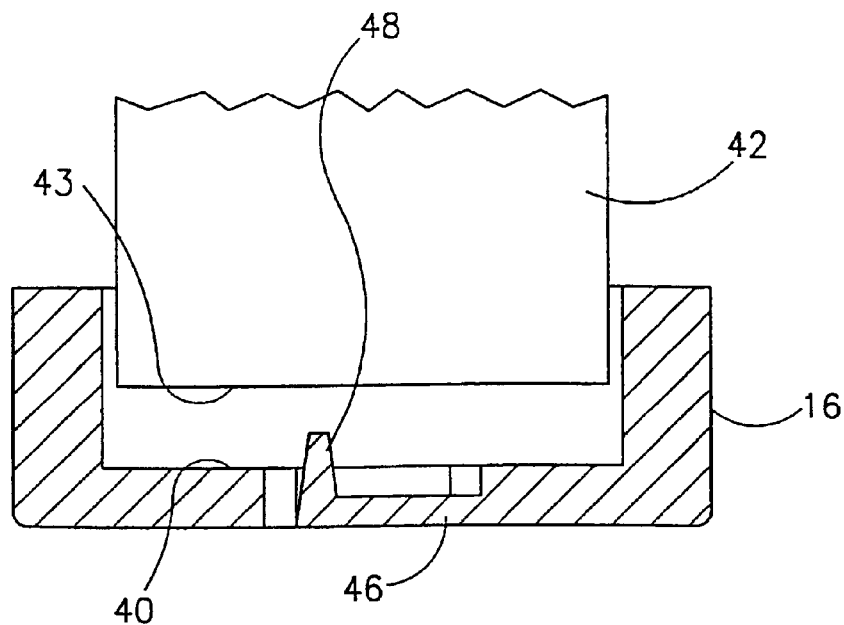
FIG. 3A is a sectional view along line III—III in FIG. 2A showing a portion of a float member in an upper position.

Base member 16 is further formed with an annular seating surface 40 adapted for supporting the float member 42 (see FIGS. 3A and 3B) when the latter is in its lowermost position.

Figure 3B:
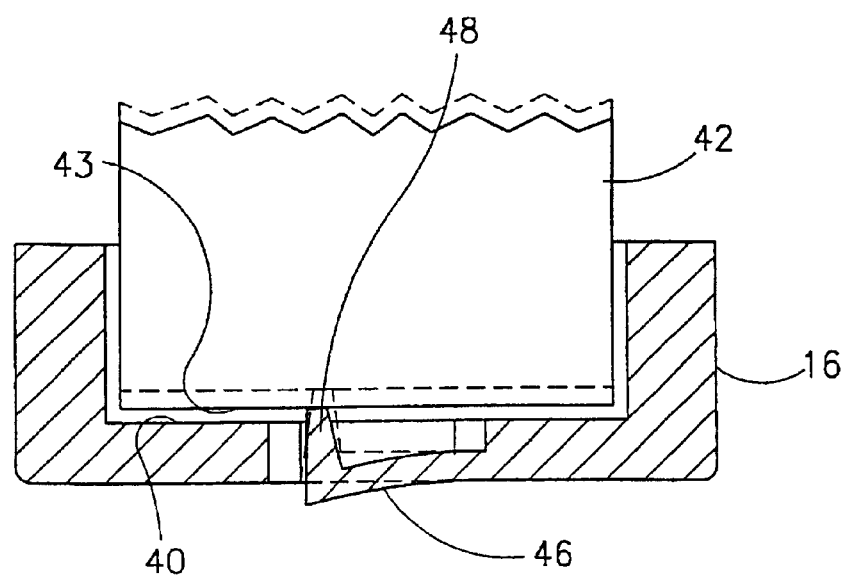
FIG. 3B is the same as FIG. 3A, the float member in its lowermost position, engaged with a dampening member.

Integrally formed with base member 16 there are, in the present example, four prong-like arms 46, connected at one end thereof to the base member and having, at their opposite, free end, an upwardly extending bulge 48 extending above the surface 40. The arrangement is such that the arms 46 are resilient and may be elastically deformed downwardly, as seen in FIG. 3B.

In the normal course of operation, the float member 42 is displaceable within the housing responsive to fluid level and within the tank and to dynamic fluid flow within the tank. Buoyancy forces together with the biasing force applied by a spring (if provided) tend to displace the float member 42 into an upward, sealing position, in which it sealingly engages the outlet port of the valve (not shown), as known per se. Gravity force acting on the float member tends to displace the float member away from the outlet port, into a downward, open position However, upon downward displacement of float member 42, under influence of gravity force, the float will overcome the force of the biasing spring (not shown) and rather than encountering the seating surface 40 of base member 16, its bottom surface 43 it will encounter bulges 48 (see FIG. 3B) entailing deformation of resilient arms 46 into the position seen in FIG. 3B in solid lines, preventing or dampening encountering of bearing surface 43 of float 42 against seating surface 40 of base member 16 with essentially reduced impacting noise.

In the present specification, a preferred embodiment has been shown and described, and it is to be understood that it is not intended thereby to limit the disclosure, but rather it is intended to cover all modifications and arrangements falling within the spirit and the scope of the invention, as defined in the appended claims, mutatis, mutandis.

For example, different variations of valves may be used for different purposes, as indicated hereinabove. Furthermore, the location of the resilient noise dampening members may be other than at the base member of the valves. These members may also be fitted at an upper portion of the housing, e.g. where a bottom portion of the float member is exposed and projects from the housing. Furthermore, it will be appreciated that rather than having the resilient members extending from the base member, they may be formed also on the float member or, on both the base member and the float member.

What is claimed is:

1. A valve for a fluid tank, the valve comprising a housing formed with one or more inlet and outlet ports, side walls and a seating wall portion supporting a float-type valve member; the valve member being axially displaceable within the housing responsive to fluid level within the tank, between an uppermost position and a lowermost position; the valve member has a top and a bottom end and a bearing portion facing the seating wall portion of the housing;

the valve characterized in that either the one end or both of the seating wall portion of the housing and the bearing portion of the valve member, are fitted with at least one dampening member integrally formed with either or both a wall portion of the housing and a wall portion of the valve member for diminishing impacting noise of the valve member encountering the housing upon displacement into the lowermost position.

2. A valve according to claim 1, wherein the seating wall portion of the housing is a boom wall thereof, and the bearing portion of the valve member is a corresponding bottom wall thereof.

3. A vale according to claim 2, wherein the housing is essentially cylindrical and the bottom wall is attached thereto.

4. A valve according to claim 1, wherein the seating wall portion of the housing is a laterally extending shoulder formed adjacent a top end of the housing, and where the bearing portion of the valve member is a corresponding laterally projecting wall portion adjacent the top end thereof.

5. A valve according to claim 4, wherein the lateral shoulder of the housing is formed adjacent a top end of the housing, and where the bearing wall portion of the valve member is formed adjacent the top end thereof.

6. A valve according to claim 1, wherein the least one dampening member is fitted at either or both a bottom wall portion of the housing constituting the seating portion, and a bottom wall portion of the valve member housing, constituting the bearing portion.

7. A valve according to claim 1, wherein the least one dampening member is a resilient member axially extending from a surface of either one or both of the facing seating wall portion and the bearing wall portion.

8. A valve according to claim 7, wherein the at least one resilient member extends from a bottom seating wall portion of the housing and has a valve-engaging portion upwardly projecting from a seating surface, adapted for engagement with the corresponding bottom bearing wall portion of the valve member.

9. A valve according to claim 7, wherein the at least one resilient member extends from a bearing wall portion of the valve member and has a housing-engaging portion downwardly projecting from a bearing surface thereof for engagement with a corresponding seating wall portion of the housing.

10. A value according to claim 7, wherein the at least one resilient member is integrally formed with either or both the bottom wall portion of the housing and the bottom wall portion of the valve member.

11. A valve according to claim 10, wherein the at least one resilient member is an arm attached at one end thereof to the respective wall portion, and is formed at an opposed end thereof with an axial projection for engagement with the other respective wall portion.

12. A valve according to claim 1, wherein at least two dampening members are provided, said dampening members being symmetrically distributed about either or both of the seating wall portion of the housing and the bearing portion of the valve member.

* * * * *